United States Patent Office 3,369,532
Patented Feb. 20, 1968

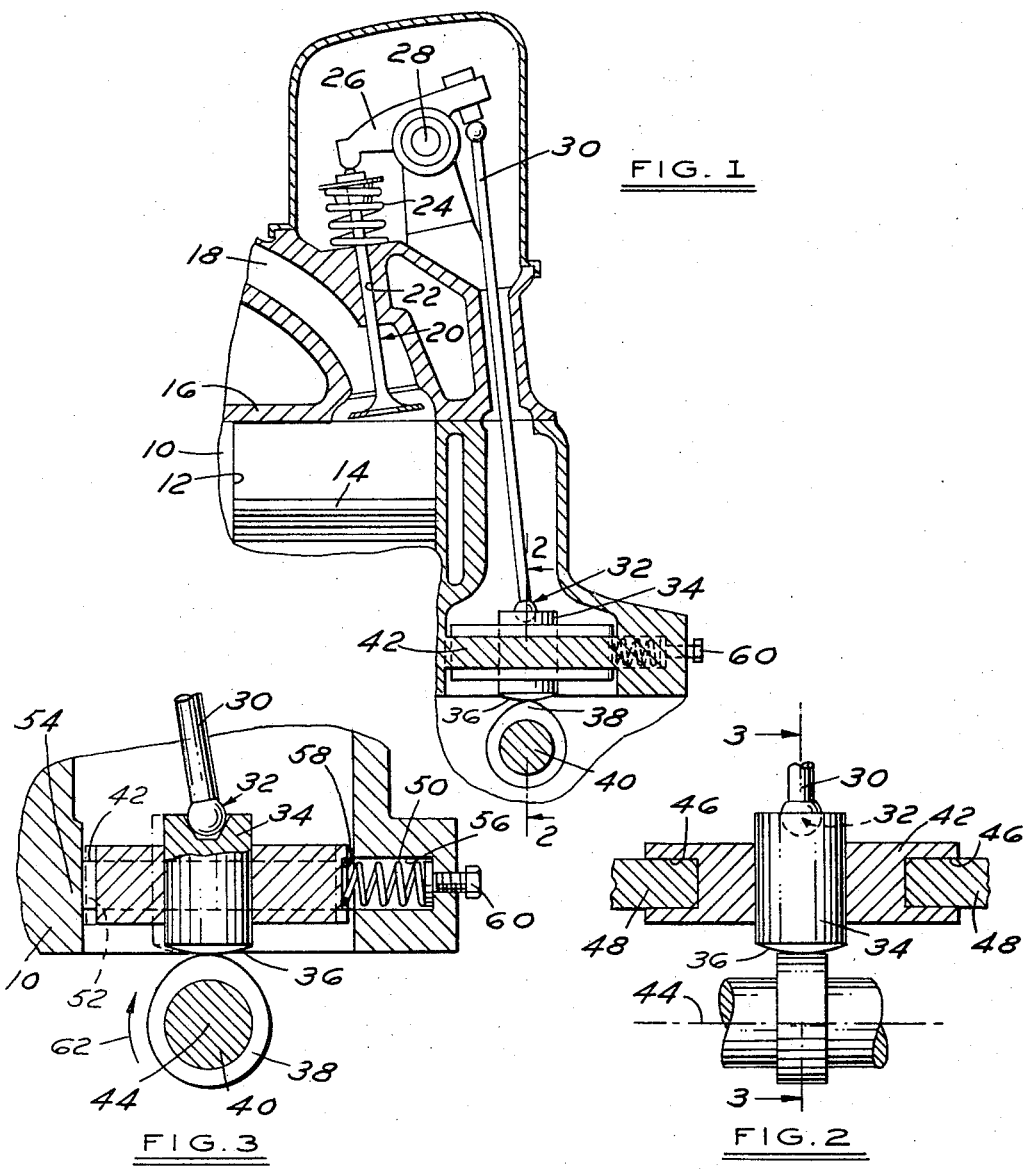

3,369,532
AUTOMATICALLY VARIABLE INTAKE
VALVE TIMING MECHANISM
Robert McIlroy, Dearborn, Mich., assignor to Ford
Motor Company, Dearborn, Mich., a corporation
of Delaware
Filed Dec. 30, 1966, Ser. No. 606,299
5 Claims. (Cl. 123—90)

ABSTRACT OF THE DISCLOSURE

A vertically movable tappet is mounted in a movable carrier, the carrier being spring biased and movable laterally to an initial position engaging one point on the tappet curved cam follower surface with a flat camshaft lobe surface, increasing engine speed increasing the valve train inertia forces acting on the tappet to automatically compress the spring and move the carrier and tappet laterally to a new position with respect to the camshaft lobe to vary the effective lift of the tappet.

---

This invention relates, in general, to an internal combustion engine, and, more particularly, to a valve train arrangement for an overhead valve type engine that automatically varies the timing and interval of opening and closing movement of the intake valve.

Substantially all commercial internal combustion engines having push rod actuated valves have a fixed intake valve timing; that is, the tappet or cam follower and cam lobe are designed to cause opening and closing of the intake valve at the same time in each crankshaft cycle regardless of the engine speed, and to have a constant open interval. These points generally are determined as a compromise between what is best for low and high speed operations. Obviously, therefore, having a fixed timing schedule sacrifices power at low engine speeds and steals power at high engine speeds.

The invention provides an automatic adjustment of the timing of the intake valve by varying the effective lift of the valve in proportion to the changing speed of the engine crankshaft. The invention accomplishes this objective by utilizing the natural inertial forces acting on the valve train as engine speed changes to vary the relative positions of the cam and tappet, and thereby the valve timing.

Therefore, it is an object of the invention to provide automatically variable timing for varying the point of opening and closing of the intake valve of an internal combustion engine as a function of change in engine speed.

It is a further object of the invention to provide an automatically variable intake valve timing mechanism consisting of a tappet or cam follower supporting member that is slidable laterally of the axis of the camshaft, to vary the valve timing, in response to changes in inertial and thereby reaction and frictional forces on the valve train as engine speed changes.

A still further object of the invention is to increase engine efficiency by the use of an automatically variable intake valve timing mechanism that is simple in construction and economical to manufacture, and is adaptable to present commercial engine constructions.

Other objects, features and advantages of the invention will become apparent upon reference to the succeeding detailed description thereof, and to the drawing illustrating the preferred embodiment thereof, wherein:

FIGURE 1 is a cross-sectional view of a portion of an engine embodying the invention, and illustrates a typical overhead valve, push rod actuated type valve train; and FIGURES 2 and 3 are enlarged cross-sectional views taken on planes indicated by and viewed in the direction of the arrows 2—2 and 3—3 of FIGURES 1 and 2, respectively.

FIGURE 1 shows a portion of an overhead valve type engine. The details of construction and operation of such an engine, except for the mechanism for varying the lateral position of each tappet, are not given since they are known and are believed to be unnecessary for an understanding of the invention. Suffice it to say that the engine has the usual engine block 10 containing one or more cylinder bores 12 each slidably containing a reciprocating piston 14. Each bore 12 is closed by a head member 16 having a carbureted air/fuel intake manifold passage 18 controlled by a spring closed, overhead type intake valve of valves 20.

Valve 20 is moved to its open position by a rocker arm 26 pivotally mounted on a fixed shaft 28. The rocker arm is engaged by one end of a push rod 30, the opposite end of which has a universal ball and socket type engagement 32 with a cam follower or tappet 34. The tappet may be of either the mechanical or hydraulic type. Tappet 34 has a curved cam follower surface 36 that at all times engages a suitably shaped cam lobe 38 formed on a camshaft 40. The camshaft would be driven in a known manner at essentially one-half the speed of the engine crankshaft by suitable interconnecting means, not shown.

Turning now specifically to the invention, tappet 34 is slidable vertically in a carrier 42 that is slidable laterally with respect to the longitudinal axis 44 of camshaft 40. As best seen in FIGURE 2, carrier 42 is essentially rectangular in shape, and has a pair of longitudinally extending grooves 46 at opposite sides. The grooves slidably cooperate with matingly formed projections 48 extending from engine block 10.

As best seen in FIGURE 3, a spring 50 normally biases carrier 42 to the left to the dotted line position 52 against engine block portion 54. The spring is seated in a recess 56 in block 10, and also in a pocket 58 provided in carrier 42. An adjusting screw 60 is provided to vary the initial preload acting on the carrier.

The automatic varying of the timing of the opening and closing movement of intake valve 20 is as follows. As the crankshaft and camshaft speeds increase, the reciprocating movement of the valve train, including push rod 30 and valve 20, increases. Thus, the inertial forces of the valve train components increase, which increases the reaction forces acting on tappets 34. This increases the frictional forces between cam 38 and the cam surface 36 on tappet 34.

With camshaft 40 rotating in the direction of arrow 62 (FIGURE 3), the resultant rightwardly diagonally upward forces exerted on tappet 34 can be resolved into vertical and horizontal force components. The horizontal rightward acting component, of course, acts on tappet 34 in a direction urging the tappet and carrier 42 rightwardly as seen in FIGURE 3 against the force of spring 56. As engine speed continues to increase, this lateral component of force also increases because of the increased frictional forces between the tappet and cam resulting from the increased valve train inertial forces. That is, the inertia of the push rod and valve train when it moves downwardly is now greater, thereby requiring more effort to lift the push rod. This greater effort results in increased friction between the cam 38 and tappet surface 36. Accordingly, tappet 34 will move rightwardly progressively from the dotted line to the full line position shown in FIGURE 3.

The above action results in a lateral rightward displacement of the tappet cam surface 36 relative to the flat face of cam 38, and accordingly varies the effective lift of the tappet. That is, when tappet 34 is in the dotted line position, the tappet can then move to its lowest point. Thus, when cam 38 begins to move the tappet, a portion of the upper travel of the tappet is used up before the valve begins to open. Now, when the cam has lifted the tappet to its highest position, for this dotted line setting of the tappet relative to the cam, the valve will then have been opened only for a short interval and for a small lift. The tappet cam surface, of course, can be chosen to provide a zero overlap between the closing of the intake valve and opening of the exhaust valve, at low engine speeds.

Conversely, as engine speed increases, and tappet 34 is moved to the full line position in FIGURE 3, valve 20 will now open as soon as or shortly after cam 38 begins to lift the tappet, since the tappet is now initially in a higher position. Also, the effective lift will be greater, and the open period of the valve longer.

It should be noted that the slanting of push rod 30 in the one plane (FIGURES 1 and 3) also will aid in moving the tappet to the right upon increases in engine speed. That is, the increasing inertia force, acting downwardly along the axis of push rod 30, will also have a horizontal component acting on tappet 34 against spring 56.

From the above, therefore, it will be clear that at low engine speeds, relative to cam 38, tappet 34 will have the position shown in dotted lines in FIGURE 3, and that as the engine speed increases, the tappet will move progressively to the right towards the full line position to automatically advance the time of opening of the intake valve and maintain it open longer. Thus, at higher engine speeds, the desired degree of valve overlap for full power can be provided.

From the foregoing, therefore, it will be seen that the invention provides a simplified and yet an efficient mechanism for automatically varying the timing and the effective lift of the intake valve mechanism of an internal combustion engine in accordance with the changes in the inertial forces acting on the valve train.

While the invention has been illustrated in its preferred embodiment, it will be clear to those skilled in the art to which the invention pertains that many changes and modifications may be made thereto without departing from the scope of the invention.

I claim:
1. An automatic valve timing mechanism for use in an internal combustion engine comprising, a rotatable camshaft having a cam thereon, a reciprocatable valve operating tappet having an arcuate surface, said cam engaging a portion of said surface for moving said tappet, a movable carrier member mounting said tappet for said reciprocating movement, means mounting said carrier for a sliding movement transversely with respect to the axis of said camshaft to various positions relative to the axis of rotation of said camshaft to vary the point of engagement of said cam with said arcuate tappet surface and thereby vary the timing of movement of the valve, and means biasing said carrier to an initial position, said carrier member being movable automatically laterally to said various positions against said biasing means in response to increases in the lateral components to the forces acting on said tappet resulting from increases in the speed of rotation of said cam increasing the valve train inertia forces and thereby increasing the reaction forces acting on said tappet and the frictional forces between said cam and tappet.

2. A mechanism as in claim 1, said biasing means comprising spring means.

3. A mechanism as in claim 1, said carrier being slidably movable in a direction essentially at right angles to the axis of rotation of said cam.

4. A mechanism as in claim 3, said biasing means comprising spring means.

5. A mechanism as in claim 4, said tappet surface varying arcuately in a direction essentially at right angles to the axis of rotation of said cam.

References Cited
UNITED STATES PATENTS

| | | |
|---|---|---|
| 2,266,077 | 12/1941 | Roan. |
| 2,326,883 | 8/1943 | Pierce et al. |
| 3,040,723 | 6/1962 | Scherenberg et al. _____ 123—90 |
| 3,112,739 | 12/1963 | Peras. |
| 3,138,038 | 6/1964 | Scherenberg et al. |

AL LAWRENCE SMITH, *Primary Examiner.*